H. M. TILESTON, DEC'D.
J. F. DEVINE, ADMINISTRATOR.
AXLE FOR VEHICLE WHEELS.
APPLICATION FILED JUNE 6, 1910.
1,082,246.
Patented Dec. 23, 1913.
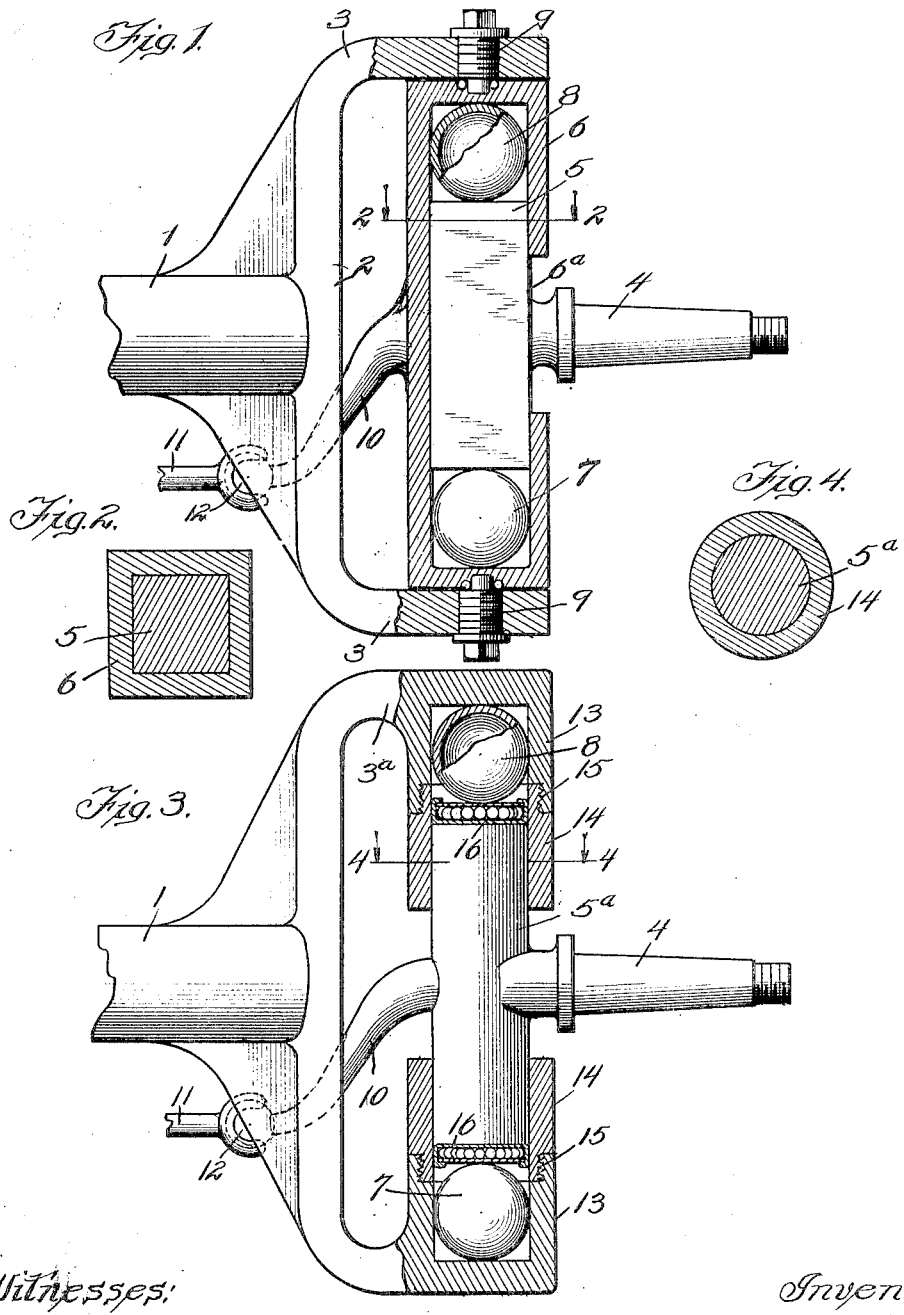
Witnesses:
Inventor:
Henry M. Tileston
By Brown & Hopkins
Atty's.

UNITED STATES PATENT OFFICE.

HENRY M. TILESTON, OF CHICAGO, ILLINOIS; JOHN F. DEVINE ADMINISTRATOR OF SAID TILESTON, DECEASED.

AXLE FOR VEHICLE-WHEELS.

1,082,246.  Specification of Letters Patent.  Patented Dec. 23, 1913.

Application filed June 6, 1910. Serial No. 565,229.

*To all whom it may concern:*

Be it known that I, HENRY M. TILESTON, a citizen of the United States, residing at Chicago, in the county of Cook and State of Illinois, have invented certain new and useful Improvements in Axles for Vehicle-Wheels, of which the following is a full, clear, and exact specification.

This invention relates more particularly to that type of axles for vehicles in which the axle spindle is separate from the axletree, and has pivotal relation thereto so that the spindle may rotate on a vertical axle to facilitate the steering of the vehicle, although in some instances this invention is applicable to separate spindles which do not have this pivotal or rotary movement with relation to the axletree.

The invention has for its primary object to provide an improved axle for vehicles, in which the axle spindle will be yieldingly held in position with relation to the axletree, so as to relieve the axletree of severe or sudden shock or jar, thus enabling the wheels at the fore ends of the axles to rise and fall without lifting the entire vehicle.

Another object of the invention is to provide an improved axle for vehicles in which the spindle will be pivotally related to the axletree and also yieldingly supported thereon so as to be capable of vertical movement with relation thereto.

With these ends in view the invention consists in certain features of novelty in the construction, combination and arrangement of parts by which the said objects and certain other objects hereinafter appearing, are attained, all as fully described with reference to the accompanying drawings, and more particularly pointed out in the claims.

In the said drawings—Figure 1 is a vertical sectional view of one end of an axle constructed in accordance with this invention. Fig. 2 is a transverse section on the line 2—2 of Fig. 1. Fig. 3 is a view similar to Fig. 1, illustrating certain modifications hereinafter described. Fig. 4 is a transverse section thereof taken on the line 4—4 Fig. 3.

1 is the axletree, and in this exemplification of the invention is shown as being of the type having a yoke 2 secured to or formed on one end and provided with laterally projecting arms 3. These arms 3 are similar to the arms or lugs ordinarily employed on axles of this type used for automobile structures, and between which arms or lugs the rotary standard of the axle spindle is usually pivoted.

4 is the axle spindle, which in this form of the invention is formed on or secured to a slide 5, which, as better shown in Fig. 2, is square or angular in cross section, and is held and guided in a box 6, which is considerably longer than the slide 5, so that the ends of the slide will have room to rise and fall in the box 6. The front or outer side of this box is cut away as shown at 6ª, to leave room for the up and down motion of the spindle 4, and interposed in the ends of the box at both ends of the slide 5 are cushions, preferably in the form of elastic balls 7, 8, and these, if desired, may be hollow and filled with air. The box 6 is pivoted by any suitable means, such as by studs 9, between the arms 3, so that it is capable of rotating on a vertical axis, while the slide 5 with the spindle 4, will be free to rise and fall vertically, thus adapting the device for the steering wheels of an automobile or the like, and at the same time yieldingly supporting the axle spindle so as to relieve the axletree of the sudden jar or shock to which the wheel is subjected during ordinary usage.

When the device is used for the steering wheel of an automobile or the like, the box 6 may be provided with the usual arm 10, and this is connected to the steering mechanism 11 by means of a suitable joint 12, as usual, the element 11 in this instance being a cross-rod which connects the arm 10 of one of the boxes 6 at one end of the axle with that at the other end, the slide 5 and interior of the boxes being square or angular, it is of course understood that the slide is free to reciprocate within the box, but is not free to rotate independently thereof, and consequently must obey the control of the arm 10.

In the modification shown in Fig. 3, the box in which the slide of the spindle 4 is mounted is formed on and is a part of the yoke 3. It will be seen that the arms 3ª of this yoke are formed with cups 13, which project toward one another and these are provided with axial extensions 14 similarly arranged, but detachable therefrom so as to facilitate the introduction of the slide which in this form is shown at 5ª. The joints 15 which connect the extensions 14 to the cups 13 are located just above and below the ends of the slide 5ª, so that when these extensions 14 are unscrewed and slipped one upwardly and the other downwardly on the slide, the ends of the slide will pass out between the opposed ends of the cup 13. The slide 5ª in this instance is cylindrical, and the interior of the guides or extensions 14 are similarly formed, so that the slide 5ª will constitute its own pivot, upon which it is capable of being turned by means of the steering mechanism acting through the intermediary of the arm 10, which in this instance, however, is formed on or secured to the slide 5ª. Inasmuch as the slide 5ª turns in this species of the invention, and would be liable to injure the balls 7, 8, anti-friction washers 16 may, if desired, be interposed between the ends of the slide and the balls.

With an axle thus constructed it will be appreciated that the shock and jar caused by the wheels encountering obstructions or irregularities on the road way, will be as effectually absorbed or relieved as is now accomplished by means of the pneumatic tire.

What I claim is:

1. In a device of the class described, the combination with a vehicle yoke, of alined bearing cups oppositely disposed, resilient bearing members in the cups, axial extensions for the cups, and an axle spindle formed on a slidable member mounted and slidable in the said extensions.

2. In a device of the class described, the combination with a vehicle yoke, of alined bearing cups oppositely disposed, resilient bearing members in the cups, removable axial extensions secured to the cups and a member slidable in said extensions and formed with an axle spindle laterally projecting therefrom between said extensions, said slidable member engaging the resilient members at both ends thereof.

3. In a device of the class described, the combination with a yoke formed with oppositely disposed and alined bearing cups, extension shells removably secured to said cups, resilient bearing members in the cups, and a rotatable member slidably mounted in said shells and bearing upon said bearing members, said slidable member being formed with a laterally projecting axle and means to rotate the member in the shells.

4. In a device of the class described, the combination with a yoke formed with spaced bearing cups, extension shells removably secured to the cups, resilient bearing members in the cups, and a member rotatably mounted in the shells having bearing engagement with said bearing members and of a length less than the spaced distance of said cups.

In testimony whereof I have signed my name to this specification, in the presence of two subscribing witnesses, on this 3rd day of June A. D. 1910.

HENRY M. TILESTON.

Witnesses:
C. H. SEEM,
J. H. JOCHUM, Jr.